United States Patent [19]

Yonechi

[11] 4,235,511
[45] Nov. 25, 1980

[54] OPTICAL FIBER CABLE CONSTRUCTIONS AND METHODS AND APPARATUS FOR FABRICATING SAME

[75] Inventor: Shinichi Yonechi, Yokohama, Japan

[73] Assignee: Sumitomo Electric Industries, Ltd., Osaka, Japan

[21] Appl. No.: 928,024

[22] Filed: Jul. 25, 1978

[30] Foreign Application Priority Data

Jul. 25, 1977 [JP] Japan .................................. 52-89464
Nov. 25, 1977 [JP] Japan .................................. 52-141831
Dec. 30, 1977 [JP] Japan .................................. 52-158044

[51] Int. Cl.³ .............................................. G02B 5/16
[52] U.S. Cl. .................................................. 350/96.23
[58] Field of Search .......................... 350/96, 23, 320; 174/70 R, 97

[56] References Cited

U.S. PATENT DOCUMENTS 4,153,332  5/1979  Longoni ............................ 350/96.23

FOREIGN PATENT DOCUMENTS 2507648  9/1976  Fed. Rep. of Germany ......... 350/96.23
2509547  9/1976  Fed. Rep. of Germany ......... 350/96.23
2511019  9/1976  Fed. Rep. of Germany ......... 350/96.23
2519050  11/1976  Fed. Rep. of Germany ......... 350/96.23
1409303  10/1975  United Kingdom .................. 350/96.23

OTHER PUBLICATIONS

Aoki et al., "Development of Optical Fiber Communication Systems...", *Hitachi Review*, vol. 26, No. 5, May 1977 pp. 181-187.

*Primary Examiner*—John K. Corbin
*Assistant Examiner*—John D. Lee
*Attorney, Agent, or Firm*—Sughrue, Rothwell, Mion, Zinn and Macpeak

[57] ABSTRACT

The present invention discloses several optical fiber cable constructions which basically dispose the optical fibers in a loosely-fitting fashion in respective longitudinal compartments provided by splicing tapes folded or shaped to a designated transverse cross-sectional shape. The loose fitting of the optical fibers overcomes the increased transmission losses and changed transmission bandwidth caused by lateral or compression forces inherently applied to the optical fibers of conventional optical fiber cable constructions. Two methods and apparatus for fabricating these optical fiber cable constructions are disclosed. In one embodiment, an assemblage die is stationary with respect to a rotary cage and a guide plate, whereas in a second embodiment the assemblage die is mounted to rotate with the rotary cage and the guide plate. In both embodiments the tape folding process for accommodating the fibers and the assemblage are achieved in tandem or in one operation.

18 Claims, 10 Drawing Figures

OPTICAL FIBER CABLE CONSTRUCTIONS AND METHODS AND APPARATUS FOR FABRICATING SAME

BACKGROUND OF THE INVENTION

1. Field of the Invention

The present invention relates to optical fiber cable constructions and to methods and apparatus for fabricating the same.

2. Description of the Prior Art

Conventional optical fiber cables typically utilize the construction shown in cross-section in FIG. 1. As shown in FIG. 1, a plurality of fiber units 2, each consisting of a plurality of optical fibers 1, are gathered and stranded around a core member 3. Core member 3 is usually fabricated from a material that exhibits a high tensile strength. An outer roll or sheath 4 made of plastic material or the like is typically formed over the outer surfaces of fiber units 2 so as to form an outer covering. It should be noted that this construction inherently subjects the optical fibers 1 to substantial lateral or compression forces.

The construction of FIG. 1 exhibits a low ratio of optical fibers per cross-sectional unit area because of the dead spaces between adjacent cable units 2 and between adjacent cable units 2 and the outer sheath 4. In order to increase the ratio of optical fibers per cross-sectional unit area, other conventional optical fiber cable structures include additional optical fibers 1 in the above-described dead spaces. However, these conventional optical fiber cable structures inherently subject the optical fibers 1 in the cable units 2 as well as the optical fibers 1 in the dead spaces to substantial lateral or compression forces.

As is known in the art, lateral or compression forces have a deleterious effect on the optical performance and, thus, the transmission characteristics of the optical fibers. Specifically, such lateral or compression forces substantially increase transmission losses and substantially change the transmission pass band of the optical fibers.

One conventional approach directed at reducing the lateral or compression forces applied to the optical fibers in an optical fiber cable utilizes a rigid or semi-rigid support member disposed within the outer covering of the cable. The support member typically is fabricated using a plastic material or the like, and is provided with a plurality of extruded ribs which extend radially outwardly from the center-line of the cable and thus define a plurality of compartments which extend longitudinally in a substantially parallel fashion along the centerline of the cable. The optical fibers are accomodated into loosely-fitting fashion in the compartments. Because of the loose fitting that is provided by this construction, the optical fibers are not subjected to substantial lateral or compression forces, and, thus, do not exhibit increased transmission losses and changed transmission band width caused by such forces, as described above.

The use of the rigid or semi-rigid support member, however, results in several major deficiencies. For example, such a support member is difficult and expensive to fabricate and also makes the insertion of the optical fibers into the compartments very difficult, especially when an optical cable having a substantial length is involved. In addition, the support member must be specially fabricated when a different number of ribs, and, thus, compartments are desired, which inherently increases fabrication cost and manufacturing time. Furthermore, the use of a support member inherently produces an optical cable having a rigid or a semi-rigid characteristic, which often makes it difficult to install the optical cable. In this connection, it should be noted that the rigid or semi-rigid characteristic also makes it difficult to assemble the optical cable at a location different from the installation location because of the required transportation of the fabricated cable. Splicing of optical fibers is a complicated and expensive operation that inherently increases transmission loss and changes transmission bandwidth. Thus, it is desirable to be able economically to manufacture and install the optical fiber cable without having to provide any undesired cable splices.

SUMMARY OF THE INVENTION

The present invention discloses several optical fiber cable constructions which basically dispose the optical fibers in a loosely-fitting fashion in respective longitudinal compartments provided by splicing tapes folded or shaped to a designated transverse cross-sectional shape. The loose fitting of the optical fibers overcomes the increased transmission losses and changed transmission bandwidth caused by lateral or compression forces inherently applied to the optical fibers of conventional optical fiber cable constructions. Two methods and apparatus for fabricating the optical fiber cable constructions are disclosed. In one embodiment, an assemblage die is stationary with respect to a rotary cage and a guide plate, whereas in the second embodiment the assemblage die is mounted to rotate with the rotary cage and the guide plate.

DETAILED DESCRIPTION OF THE PREFERRED EMBODIMENTS

The optical fiber cable constructions according to the present invention will now be described.

Figure 2:
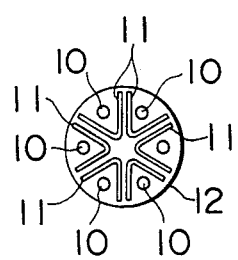
FIG. 2 is a transverse cross-sectional view of the construction of a first embodiment of the optical fiber cable of the present invention.

Referring now to FIG. 2, the first embodiment of the optical fiber cable construction of the present invention will now be described. A plurality of optical fibers 10 are accommodated in the recesses provided in a plurality of V-shaped folded splicing tapes 11. It should be noted that optical fibers 10 can be provided with an appropriate coating if desired. Because of the recesses provided by folding splicing tapes 11 into a V-shape in the longitudinal direction, the optical fibers 10 can be accommodated in a loosely-fitted fashion therein. As shown in FIG. 2, each of the fibers 10 is accommodated in a separate recess provided by a folded splicing tape 11. Of course, more than one fiber 10 could be accommodated in each recess. Because of the loose fitting, the optical fibers 10 are not subjected by the folded splicing tapes 11 to any appreciable lateral or compression forces.

In the construction of FIG. 2, each of the splicing tapes 11 is shaped or folded to have a groove in the longitudinal direction and each splicing tape so shaped or folded has a symmetrical transverse cross-section. Splicing tapes 11 are arranged, as shown in FIG. 2, in a radial fashion with respect to the center-line of the optical fiber cable formed thereby.

The material for splicing tapes 11 is preferably a rather rigid material that is easily shaped or folded but which retains the shape or fold provided thereby. One example of a suitable material for splicing tape 11 is a thick polyester having a thickness, for example, of about 0.1 mm. Another suitable material for splicing tape 11 is aluminum. Of course, additional materials are equally suitable for splicing tape 11.

It should be noted that a high tension rod (not shown) can be provided along with one of the optical fibers 10 in the compartment defined by the associated folded splicing tape 11. This high tension rod acts to increase the tensile strength of the optical fiber cable. Of course, more than one such high tension rod can be provided.

Similarly, it should be noted that a cushioning rod or material (not shown) can be provided along with one of the optical fibers 10 in the compartment defined by the associated folded splicing tape 11. The cushioning rod or material acts to cushion the associated optical fiber 10 from physical shock. One suitable material for the cushioning rod or material is rope or jute. Of course, more than one such cushioning rod or material can be provided.

It should be noted that a colored member (not shown) can be provided along with one of the optical fibers 10 in the compartment defined by the associated folded splicing tape 11. This colored member provides a capability of identification of a designated optical fiber 10 or a designated compartment. It should be realized that the colored function could be added to either the high tension rod or to the cushioning rod. Alternatively, at least one of the tapes is colored to realize this function. Of course, more than one such colored member can be provided.

As shown in FIG. 2, a tape 12 is spirally wound or spliced in a longitudinal fashion along the outer peripheral ends of the folded spliced tapes 11 so as to form the outer covering of the optical fiber cable formed thereby. Any suitable material, such as polyester or polyethylene tape, can be used for tape 12. It should be noted that tape 12 can be bonded or fastened, if desired, to selected areas along the outer peripheral ends of the folded spliced tapes 11. An adhesive agent or ultrasonic bonding is used for bonding. The bonding is advantageous in developing the end portion of the cable to identify the fiber or to connect fibers.

Figure 3:
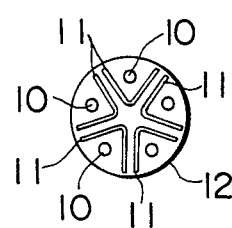
FIG. 3 is a transverse cross-sectional view of the construction of a modification of the first embodiment of the optical fiber cable of the present invention as shown in FIG. 2.

Referring now to FIG. 3, a variation on the construction of the first embodiment of FIG. 2 is shown. Like numbers between FIGS. 2 and 3 refer to like components. The differences between FIGS. 2 and 3 is that in FIG. 3 the spliced tapes 11 are folded or shaped so as to assume more of a U-shape than the V-shape of FIG. 2. It should also be noted that five optical fibers 10 and associated compartments defined by folded splicing tapes 11 are provided in the cable of FIG. 3, whereas there are six such optical fibers 10 and associated compartments defined by folded splicing tapes 11 in the cable of FIG. 2.

Figure 4:
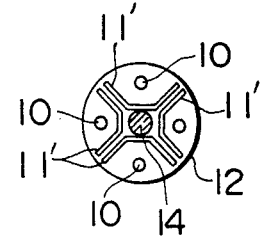
FIG. 4 is a transverse cross-sectional view of the construction of a second embodiment of the optical fiber cable of the present invention.

A second embodiment of the construction of the optical fiber cable of the present invention is shown in FIG. 4. Like reference numerals in FIGS. 2 and 4 designate like elements. It should be noted that splicing tapes 11' are folded so as to have a flattened U-shape in the transverse cross-section. The flattened U-shape of splicing tapes 11' creates a compartment along the center-line of the cable. As shown in FIG. 4, a core member 14 is disposed in the center-like compartment. Core member 14 can exhibit a high tensile strength or can also be an optical fiber 10.

An actual cable has been constructed with the configuration shown in FIG. 2, but the dimensions are equally applicable to the configurations of FIGS. 3 and 4. In the actual cable, the optical fibers 10 had diameters of 0.9 mm, and the outer diameter of the optical fiber cable was 4.0 mm. Even this cable, with its very small dimensions, subjects the optical fibers 10 to extremely small lateral and compression forces since each of the optical fibers 10 are loosely accommodated in the associated compartment. The actual cable exhibited a low transmission loss and a stable transmission bandwidth.

Figure 5:
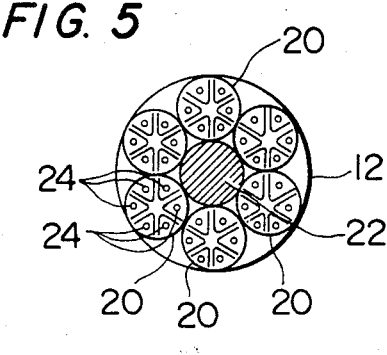
FIG. 5 is a transverse cross-sectional view of the construction of a third embodiment of the optical fiber cable of the present invention.

A third embodiment of the cable structure of the present invention is shown in FIG. 5. A plurality of cable units 20 are disposed within an outer cover 12 made in the same fashion as outer cover 12 of FIGS. 2–4 described above. A small number of optical fibers 24 are disposed within each cable unit 20 and are accommodated in a loosely-fitted manner as shown in FIGS. 2 through 4. Thus, only a very small lateral or compression force is applied to each optical fiber 24 due to the loosely-fitted manner in which the fibers are arranged in the cable units 20.

As shown in FIG. 5, reference numeral 22 designates a central member, which is preferably a tension member having high tensile strength. However, central member 22 can be replaced with a cable unit 20. Thus, as shown in FIG. 5, there are six cable units 20 if the central member 22 is a tension member, or there are seven cable units 20 if the central member 22 is a cable unit 20.

Figure 1:
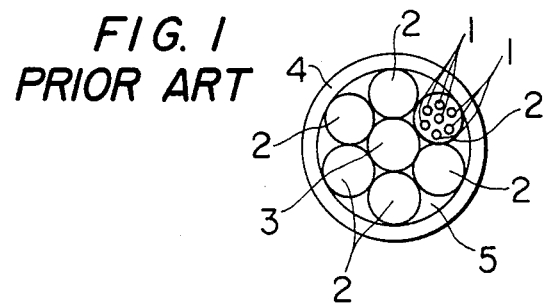
FIG. 1 is a transverse cross-sectional view of the construction of a conventional optical fiber cable.
Figure 6:
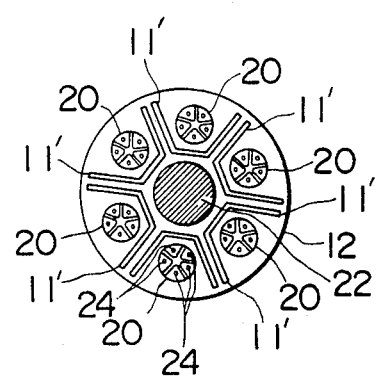
FIG. 6 is a transverse cross-sectional view of the construction of a fourth embodiment of the optical fiber cable of the present invention.

FIG. 6 shows a fourth embodiment of the optical fiber cable of the present invention. The fourth embodiment of FIG. 6 is a combination of the second embodiment shown in FIG. 4 and the third embodiment shown in FIG. 5. As shown in FIG. 6, a plurality of cable units 20 having a cross section shown in FIGS. 2 through 4 are accommodated in U-shaped grooves of folded spliced tapes 11'. Cable units 20 and folded spliced tapes 11' are disposed around a central member 22, and the outer peripheral surfaces thereof are covered with an outer tape 12. In the fourth embodiment, because the optical fibers 24 are disposed in the cable units 20 and the cable units 20 are loosely supported in the cable assembly, the optical fibers 24 are not subjected to any appreciable lateral or compression pressure. In this embodiment, cables having a cross section shown in FIG. 1 are usable as cable units 20.

The remarkable advantage of the present invention is that, in the above described optical fiber cable structures, the stranding pitch of the optical fibers 10, the folded splicing tapes 11, 11' and the cable units 20 can be selected to be any value in accordance with the flexibility of these elements. Of course, for special purposes, no stranding need be provided.

Figure 7:
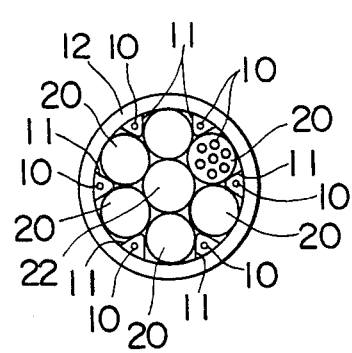
FIG. 7 is a traverse cross-sectional view of the construction of a fifth embodiment of the optical fiber cable of the present invention.

The construction of a fifth embodiment of the optical fiber cable of the present invention is shown in FIG. 7. The fifth embodiment of the present invention provides unit-type optical fiber cable wherein V-shaped compartments defined by V-shaped folded spliced tapes 11 are disposed in the gaps defined between adjacent cable units 20 and an outer sheath 12. The optical fibers 10 are accommodated in the V-shaped compartments defined by the folded spliced tapes 11. It should be noted that like reference numerals in FIG. 7 refer to like elements in FIGS. 2-6.

In the optical fiber cable of the fifth embodiment, because the optical fibers 10 are accommodated in V-shaped grooves formed by the V-shaped tapes 11, which are disposed in gaps defined between the adjacent units 20 and the outer sheath 12, the lateral and compression pressure applied to the optical fibers 10 is very small. In an actual cable having a construction as shown in FIG. 7, it was possible to accommodate 48 optical fibers 10, with each optical fiber 10 having a diameter of 0.9 mm, in a cable sheath having an outer diameter of about 15 mm, if a central member 22 is replaced by a cable unit 20.

The methods and apparatus for constructing the optical fiber cable constructions according to the present invention will now be described.

Figure 8:
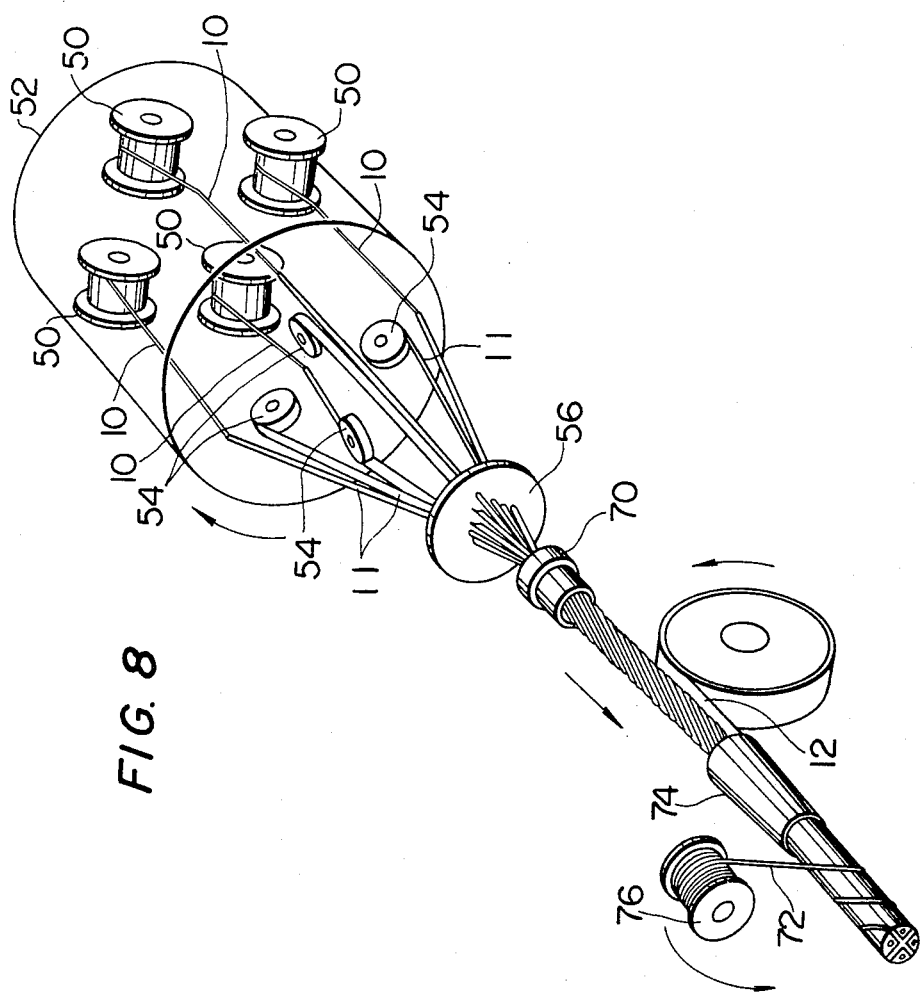
FIG. 8 is a perspective view showing the apparatus and basic method for providing the various optical fiber cable constructions of the present invention.

The basic method for producing the above described optical fiber cable according to the present invention will now be described. As shown in FIG. 8, a plurality of bobbins 50 around which a corresponding plurality of optical fibers 10 are wound, and a plurality of rolls of splicing tape 54 for supplying unfolded splicing tapes 11, are mounted for rotation in a rotating cage 52. The rolls 54 are disposed to prevent the splicing tapes 11 from being twisted or stranded, while the bobbins 50 are disposed either to strand or not to strand the optical fiber 10.

However, in order to prevent the optical fiber 10 from exhibiting mechanical distortion, the bobbins 50 should be disposed to strand the optical fibers 10. As shown in FIG. 2, the number of the optical fiber bobbins 50 is equal to the number of tape rolls 54.

Figure 9:
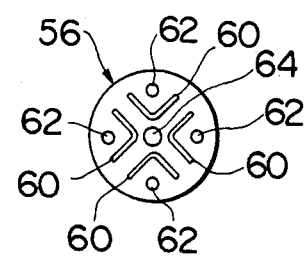
FIG. 9 is a plan view of one embodiment of the guide plate 56 used in the method and apparatus of the present invention shown in FIG. 8.

The optical fibers 10 and unfolded splicing tapes 11 are fed from the rotary cage 52 to a folding means, which folds each splicing tape 11 to a desired cross-sectional shape, for example, either a V, U, or flattened U shape. Various methods can be employed to fold or shape the splicing tapes 11 into the desired shape. For example, a pair of rollers can be used (not shown). Alternately, the unfolded splicing tapes 11 can be passed through a plurality of corresponding slits or openings of predetermined shape formed in a guide plate 56. The guide plate 56 is preferably provided with additional holes for passing the optical fibers 10 therethrough. FIG. 9 shows the plan view of one embodiment of the guide plate 56 that is provided with a plurality of slits 60 for folding the unfolded splicing tapes 11 to the desired shape, with a plurality of holes 62 for passing said optical fibers 10 therethrough, and with a hole 64 for passing a center member therethrough. Thus, guide plate 56 acts both to fold the unfolded splicing tapes 11 to the desired shape, and also to orient the folded splicing tapes 11 with respect to the corresponding optical fibers 10.

It should be noted that the guide plate 56 should be integrally mounted for rotation with the rotary cage 52. A pair of rollers can be provisionally used, if desired, to fold the unfolded splicing tapes 11 even in the case when a guide plate 56 is also used to fold the unfolded splicing tapes 11. The guide plate 56 should be used in order to control the positional relationship between the optical fibers 10 and folded splicing tapes 11, and to accurately introduce the optical fibers 10 into grooves of the folded splicing tapes 11.

The folded splicing tapes 11 together with optical fibers 10 disposed therein are gathered and stranded in an assemblage die 70. Normally, the assemblage die 70 is not mounted for rotation.

The stranding pitch of the optical fiber cable is determined by the rotational angular velocity of the cage 52 with respect to the take-up speed of the optical fiber cable.

The assembled cable core is preferably covered with an outer tape 12. Tape 12 can either be spirally wound or spliced in a longitudinal direction to the assembled cable core. In FIG. 8, the cable core is spliced in the longitudinal direction by a tape 12, and the tape 12 is wrapped over the cable core by means of a forming means 74. Reference numeral 72 designates string or tape spirally wound on the outer surface of tape 12 to prevent the tape 12 from separating from the optical fiber cable.

Figure 10:
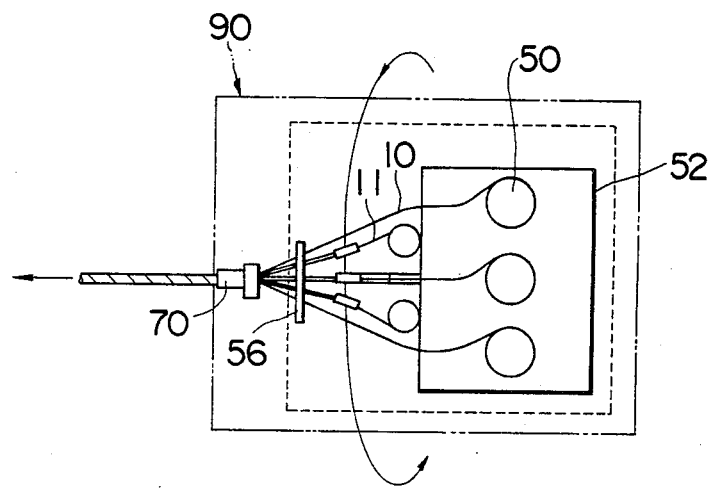
FIG. 10 is a schematic view showing a second embodiment of the method and apparatus for providing the various optical fiber cable constructions of the present invention.

The second embodiment of the method and apparatus of the present invention is shown in FIG. 10. It should be noted that like reference numbers designate like elements in FIGS. 8, 9 and 10.

In the first embodiment of the method and apparatus discussed above, it was stated that guide plate 56 was preferably integrally mounted for rotation with rotary cage 52 so that both have the same rotational angular velocity. However, in that embodiment, it was stated that the assemblage die 70 was maintained fixed, and that the stranding pitch was determined by the ratio of the rotation of rotary cage 52 with respect to the take-up speed of the cable.

The second embodiment of the method and apparatus of the present invention, as shown in FIG. 10, produces a stranded core which is superior to that produced by the first embodiment. Specifically, the stranded core produced by the second embodiment exhibits a more uniform shape in the shape of the compartments, and also exhibits an improved dimensional accuracy. This improvement is due to the rotation of the assemblage die 70 together with guide plate 56 and the rotary cage 52.

In the second embodiment of the method and apparatus of the present invention the system surrounded by the dotted chain line 90 of FIG. 10 is integrally rotated. The rotation of the assemblage die 70 can be easily realized by a mechanical and integral connection between the die 70 to the guide plate 56 and the rotary cage 52. Alternatively, instead of the mechanical linkage therebetween, the die 70 can be integrally rotated with the rotary cage 52 by supporting the die 70 by means of a bearing to permit free rotation thereof. Incidentally, the system surrounded by the broken line shows a conventional rotation system.

What is claimed is:

1. An optical fiber cable unit for accommodating a plurality of optical fibers comprising:

a plurality of splicing tapes, each said splicing tape shaped to have a groove in the longitudinal direction of said cable unit, each said splicing tape having a symmetrical transverse cross-section, said splicing tapes arranged in a symmetrical radial fashion with respect to a center line of a cable formed thereby to define peripheral compartments which are open in the direction facing the periphery of said cable unit, each of said compartments having a cross-section sufficient to accommodate in a loosely-fitting manner at least one of said optical fibers.

2. The optical fiber cable unit as recited in claim 1, further comprising an outer sheath composed of a tape wound over the outer surfaces of said compartments so as to form an outer covering for said cable.

3. An optical fiber cable unit as recited in claim 2, wherein said outer sheath is bonded to selected areas of said outer surfaces of said compartments.

4. An optical fiber cable unit as recited in claim 1, further comprising a core member, said core member substantially disposed along the center line of said cable.

5. An optical fiber cable unit as recited in claim 1, further comprising at least one tension rod disposed in each of said compartments so as to increase the tensile strength of said cable.

6. An optical fiber cable unit as recited in claim 1, further comprising at least one cushioning rod, each said cushioning rod being disposed in one of said compartments.

7. An optical fiber cable unit as recited in claim 1, further comprising at least one colored member, each said colored member being disposed in one of said compartments for identification.

8. An optical fiber cable unit as recited in claim 1, wherein at least one of said splicing tapes is colored for identification.

9. The optical fiber cable unit as recited in claim 1, wherein each said splicing tape is V-shaped in the transverse cross-section.

10. The optical fiber cable unit as recited in claim 1, wherein each said splicing tape is U-shaped in the transverse cross-section.

11. The optical fiber cable unit as recited in claim 1, wherein each said splicing tape is a flattened U-shape in the transverse cross section.

12. The optical fiber cable unit as recited in claim 1 further comprising a plurality of optical fibers, being accommodated in each of the compartments, said plurality of optical fibers being formed in a unit structure.

13. A unit-type optical fiber cable comprising a plurality of cable units as recited in claims 1, 2, 3, 4, 5, 6, 7, 8, 9, 10, 11 or 12 and an outer cable sheath adapted to cover said plurality of cable units.

14. The unit-type optical fiber cable as recited in claim 13, further comprising a tension member around which said plurality of cable units are disposed.

15. The unit-type optical fiber cable as recited in claim 13, further comprising a plurality of additional tapes each having a flattened U-shape cross section, each of said cable units being accommodated in a different one of said additional flattened U-shaped tapes.

16. The unit-type optical fiber cable as recited in claim 13 further comprising a plurality of additional ones of said splicing tapes respectively disposed around the periphery of said cable in gaps defined between adjacent cable units, and an additional one of said optical fibers disposed in a loosely-fitting manner in the compartment formed by said each additional splicing tape.

17. A unit-type optical fiber cable of the type for accommodating a plurality of optical fibers and having a plurality of separate optical fiber cable units disposed in an outer cable sheath, the improvement comprising a plurality of splicing tapes, each of said splicing tapes shaped to have a groove in the longitudinal direction of said cable, each splicing tape having a symmetrical transverse cross section so as to define a compartment to accommodate in a loosely-fitting manner at least one of said optical fibers, each said compartment being open in the direction facing the periphery of said cable, and each said compartment being disposed in said cable in a corresponding gap defined between adjacent cable units within said cable.

18. A unit-type optical fiber cable as recited in claim 17, wherein each said splicing tape is V-shaped in the transverse cross-section.

* * * * *